Nov. 20, 1951 D. G. TROWBRIDGE 2,575,852
BOBBER
Filed June 8, 1946

Inventor
Dale G. Trowbridge
By Worster & Davis
Attorneys

Patented Nov. 20, 1951

2,575,852

UNITED STATES PATENT OFFICE 2,575,852

BOBBER

Dale G. Trowbridge, Stamford, Conn.

Application June 8, 1946, Serial No. 675,368

5 Claims. (Cl. 43—16)

This invention relates to a fisherman's bobber, and has for an object to provide an improved and simplified bobber of this type which will be effective in automatically setting the hook in the mouth of a fish as he takes or nibbles the bait.

Another object is to provide a construction in which the position of the bobber on the line may be changed for any depth of line without breaking the line, and also one which may be attached to or detached from the line without breaking the line.

Another object is to provide a device of this character in which when the hook setting device is operated, it will act as an indicator to show that it has been tripped.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

Figure 2:
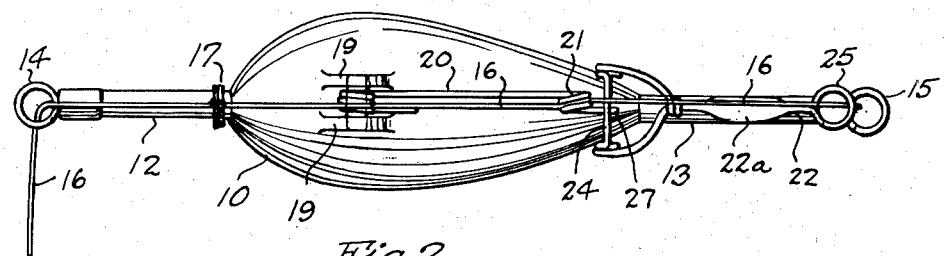
Figure 1:
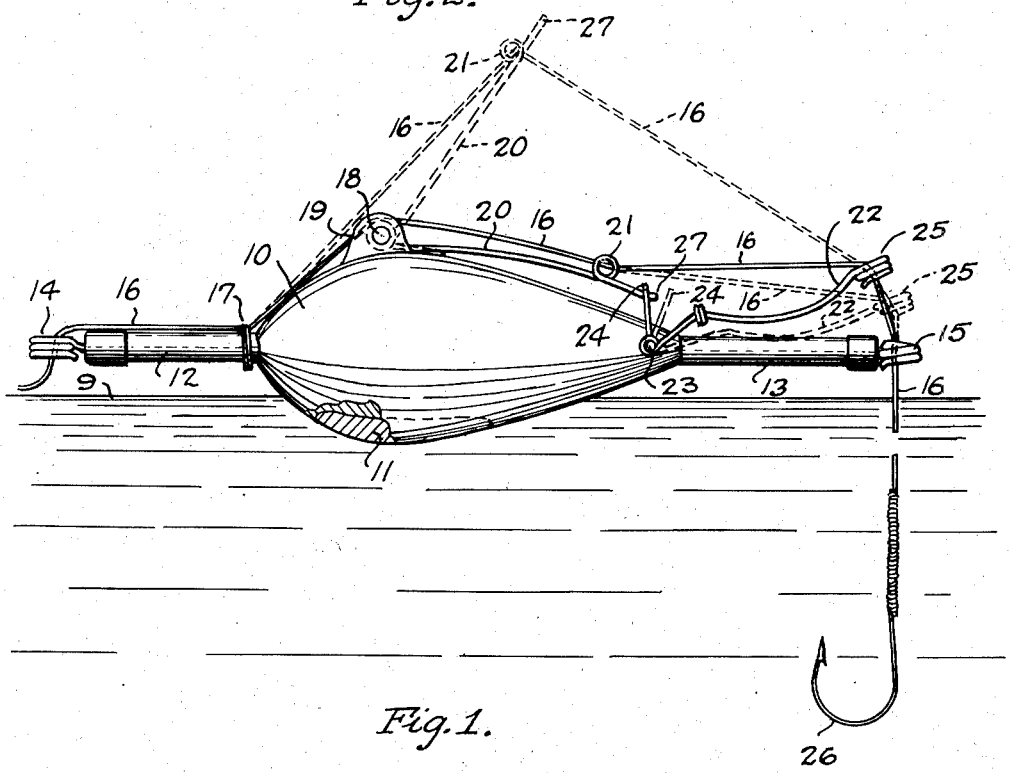

In this drawing:

Fig. 1 is a side elevation of the device showing it in normal position on the water, and Fig. 2 is a top plan view.

This device comprises a body 10 of wood or plastic or some material that will readily float, and is shaped and arranged to normally lie horizontally on the water 9. Preferably there is a recess in its lower side in which may be mounted a weight 11 of some kind, such as lead or other suitable material, to normally maintain the float in the upright position. At its opposite ends are extensions 12 and 13 carrying suitable eyes 14 and 15 for the line 16. This line from the fishing pole is laced through the eye 14, and secured with two half hitches at 17. Mounted on the top of the float, as on a pin 18 between upright ears 19, is a spring arm 20 provided with an eye 21, and this eye or grip 21 comprises a pair of spring loops arranged side by side so that the line 16 may be inserted between them and firmly gripped by these loops. The arm 20 is so mounted that it tends to spring upwardly to the dotted line position of Fig. 1.

Mounted forwardly of this spring is a catch on a spring wire 22 pivoted to the float at 23, the catch being a transverse bar 24 formed in one piece with the arm 22. This is flattened horizontally at an intermediate portion 22a so as to be more yielding vertically than horizontally or laterally. At the other end of the arm 22 is a loop 25 for the line 16, and through which it may be laced before lacing through the loop 15 on the float and then down into the water to the hook 26. In setting the device, the loop 21 which tightly grips the line 16 is bent downwardly to the full line position of Fig. 1, and its free end 27 is placed under the cross bar 24 by swinging the member 22 and its eye 25 upwardly to the full line position shown. In this position the eye 25 is located above a straight line from the gripping loop 21 to the eye 15 and so holds the line 16 out of this straight line, and therefore, should a fish give a slight pull on the hook 26 and thus the line between it and the eye 15, it will draw the eye 25 downwardly to the dotted line position. This will move the catch bar 24 off the end 27 of the wire 20 to the dotted line position, thus releasing the spring 20 so that it jumps upwardly to its dotted line position, carrying with it the loop 21 which is tightly clamped to the line 16. This upward movement of the spring 20 gives a quick jerk on the line, which sets the hook in the fish's mouth. As this is much quicker than the fisherman could do it, it is much more apt to hook the fish. It also acts as a telltale to indicate that it has been tripped by a fish biting or nibbling on the bait. The fish can then be played or pulled in in the usual manner.

The eyes 14, 15 and 25 are preferably wire loops spirally wound, as indicated, so that the line may be passed into the loops and through them by placing the line laterally between the coils and following around the coils until it gets into the loop. The turns may be somewhat spaced from each other to facilitate this operation and permit the line to pass between the convolutions of the coil, or the coils may be of spring wire which will readily yield to permit this operation. The line is gripped between the loops 21 by merely pressing it laterally into position between these loops. It will, therefore, be seen that with this construction and arrangement the bobber can be placed on the line or removed from it without cutting or breaking the line, as it is not necessary to thread the hook or other object on the line, as a sinker, for example, through the eyes in order to get the line through these various eyes or guides of the bobber. It is also possible to readily change the position of the bobber on the line without breaking or cutting the line.

Having thus set forth the nature of my invention,

I claim:

1. A bobber comprising an elongated float adapted to lie on the water in a horizontal position, guides for a line extending from rods located at opposite ends of the float and permitting free passage of the line, a spring mounted on the upper side of the float provided with a grip for the line and tending to move this grip to an upper position, and a catch pivotally mounted on the float and provided with means to engage said spring and retain the grip in a lower position, said catch including an arm provided with a guide for the line and located between and out of alignment with the grip and the adjacent end guide when the catch is in the holding position so that a pull on the line will tend to move the portion thereof between the grip and the end guide into alignment therewith to release the catch.

2. A bobber comprising an elongated, horizontal float, guides for free movement of a line extending from rods located at opposite ends of the float, a spring arm mounted on the upper side of the float between the guides and carrying a grip for the line adjacent its outer end, said spring arm being mounted to tend to shift said grip to an upper position, and a catch mounted on the float adapted to retain said grip in its lower position, said catch being provided with a guide for the line located between and out of alignment with the grip and adjacent end guide when holding the grip in the lower position so that a pull on the line will tend to move it into alignment and operate the catch to release the grip.

3. A bobber comprising an elongated, horizontal float, guides for a line extending from rods located at opposite ends of the float, a spring arm mounted on the upper side of the float between the guides and carrying a grip for the line adjacent its outer end, said spring arm being mounted to tend to shift said grip to an upper position, and a catch mounted on the float adapted to retain said grip in its lower position and provided with a guide for the line located between and out of alignment with the grip and adjacent end guide when holding the grip in the lower position so that a pull on the line will tend to move it into alignment and operate the catch to release the grip, said guides each comprising a coil of wire forming an eye through which the line may be threaded by passing it laterally between the coils, and the grip being also of spring coils side by side so the line is gripped when inserted between them so that the bobber may be attached to a line intermediate its length, while the line is intact and regardless of objects on the line on opposite sides of the bobber which are larger than the openings in the guides.

4. A bobber comprising an elongated float adapted to lie on the water in a horizontal position, a guide for a line extending from a rod located at each of the opposite ends of the float, a spring arm mounted on the upper part of the float and provided with a grip for the line between said guides and located adjacent the outer end of the arm, said spring arm being mounted to tend to shift said grip to an upper position, and a catch pivoted to the float adapted to retain said arm and grip in a lower position, said catch being provided with a guide for the line located between the grip and an end guide and spaced above the adjacent end guide when in the arm holding position and adapted to be shifted downwardly by a pull on the line to release said arm.

5. A bobber comprising an elongated float adapted to lie on the water in a horizontal position, a guide for a line extending from a rod located at each of the opposite ends of the float, a spring arm mounted on the upper part of the float between the guides and carrying a grip for the line adjacent its outer end, said spring arm being mounted to tend to shift said grip to an upper position, a weight on the under side of the float to keep it with the spring arm at the upper side of the float, and a catch mounted on the float adapted to retain said grip in its lower position, said catch being provided with a guide for the line located between and out of alignment with the grip and adjacent end guide when holding the grip in the lower position so that a pull on the line will tend to move it into alignment and operate the catch to release the arm and grip.

DALE G. TROWBRIDGE.

REFERENCES CITED

The following references are of record in the file of this patent:

UNITED STATES PATENTS

| Number | Name | Date |
| --- | --- | --- |
| 202,818 | Hesse | Apr. 23, 1878 |
| 1,152,755 | Perron | Sept. 7, 1915 |
| 2,181,458 | LaGue | Nov. 28, 1939 |
| 2,283,779 | Winter | May 19, 1942 |
| 2,316,256 | Kohn | Apr. 13, 1943 |
| 2,374,752 | Johnson | May 1, 1945 |

FOREIGN PATENTS

| Number | Country | Date |
| --- | --- | --- |
| 800,436 | France | July 4, 1936 |